United States Patent [19]
Hong et al.

[11] Patent Number: 5,873,269
[45] Date of Patent: Feb. 23, 1999

[54] POWER SYSTEM OF WASHING MACHINE

[75] Inventors: Min-Pyo Hong, Suwon; Hwan-Young Choi, Anyang, both of Rep. of Korea

[73] Assignee: Samsung Electronics Co., Ltd., Suwon, Rep. of Korea

[21] Appl. No.: 972,576

[22] Filed: Nov. 18, 1997

[30] Foreign Application Priority Data

Feb. 18, 1997 [KR] Rep. of Korea ............... 1997 4855

[51] Int. Cl.[6] ............... D06F 23/04; D06F 37/40
[52] U.S. Cl. ............................................... 68/23.7
[58] Field of Search ..................................... 68/23.7

[56] References Cited

U.S. PATENT DOCUMENTS

| | | | |
|---|---|---|---|
| 2,609,697 | 9/1952 | Ruscoe | 68/23.7 X |
| 2,699,682 | 1/1955 | Castner | 68/23.7 X |
| 5,172,573 | 12/1992 | Sharp et al. | 68/23.7 |
| 5,586,455 | 12/1996 | Imai et al. | 68/23.7 X |

*Primary Examiner*—Philip R. Coe
*Attorney, Agent, or Firm*—Burns, Doane, Swecker & Mathis, L.L.P.

[57] ABSTRACT

A clothes washing machine includes a water tub, a spin basket, and a clothes agitator. A vertical dehydrating shaft is fixed to the spin basket, and a laundering shaft extends coaxially within the dehydrating shaft. Upper and lower ends of the laundering shaft are connected to the agitator and a motor respectively, whereby rotation of the motor is always transmitted to the agitator. In order to selectively connect the dehydrating shaft to the laundering shaft (e.g., during a spin-drying operation), a connecting gear is mounted on the dehydrating shaft for rotation therewith and for vertical movement relative thereto. A power-driven actuator is provided for selectively moving the connecting gear up or down. When the connecting gear moves down, lower teeth thereon become operably connected to the motor so that the dehydrating shaft and laundering shaft rotate together. During a washing or rinsing operation, the connecting gear is moved up, whereby upper teeth thereon become connected to a fixed element, whereby the dehydrating shaft is fixed against rotation. One of the upper teeth, and one of the lower teeth, of the connecting gear are longer than the other teeth to guide the connecting gear into meshing relationship with other sets of teeth when the connecting gear is moved up and down.

7 Claims, 7 Drawing Sheets

45

POWER SYSTEM OF WASHING MACHINE

BACKGROUND OF THE INVENTION

(1) Field of the Invention

The present invention relates to a power system of a washing machine and, more particularly, to a power system of a washing machine which can suppress rotation of the spin basket during a laundering operation and allow the same to rotate at high speeds during a spin drying operation.

(2) Description of the Related Art

Generally, a washing machine includes a main body defining an outer configuration thereof, a water reserving drum or water tub installed within the body, a rotating drum or spin basket, and an agitator blade mounted within the water reserving drum. A power system for driving the rotating drum and blade is mounted under the water reserving drum.

The power system conventionally comprises a motor, a power transmission system, and a belt for connecting the motor to the power transmission system. This will be described hereinbelow with reference to FIG. 6.

As shown in drawing, a conventional power transmission system 100 has a hollow dehydrating shaft 11 and a hollow laundering shaft 102 inserted into the hollow portion of the hollow dehydrating shaft 101. The laundering shaft 102 is divided into upper and lower portions, with a planetary gear unit 103 being disposed therebetween. The planetary gear unit 103 changes a rotating speed of the power transmission system 100. A brake band 14 and a brake lever 105 are disposed beside the dehydrating shaft 101 to brake the rotation of the dehydrating shaft 101. A one-way bearing 106, for suppressing an idling of a rotating drum (spin basket) 110 by cooperating with the brake band 104 and permitting the dehydrating shaft 101 to rotate in only one direction, is mounted on an outer circumference of the dehydrating shaft 101. In addition, a clutch spring 107 and a clutch lever 108 for transmitting/interrupting power from the motor to both the dehydrating shaft 101 and the laundering shaft 102 are mounted under the one-way bearing 106. A pulley 109 on which a belt (not shown) is engaged is mounted on a lower end of the laundering shaft 102.

In this conventional power transmission system 100, torque of the motor is selectively transmitted to a rotating blade 111 or the rotating drum 110 through the clutch spring 107, thereby performing the washing and dehydrating (spin drying) operations. To achieve this, it is necessary that the clutch spring 107 has a high degree of tensile strength to enable the transmission or interruption of torque from the motor to the dehydrating shaft 101 and the laundering shaft 102, both of which are rotated at a high speed. However, the manufacturing process for such a spring having high tensile strength is complicated, and, as a result, manufacturing costs are increased.

In addition, the brake band 104 for preventing the rotating drum 110 from idling during the washing operation is, when it brakes the rotating drum 110 in one direction, subjected to high resistance by a force generated when the rotating drum 110 is being urged to rotate by a water current created within the water reserving drum. The above described one-way bearing 106 must thus be used, making the structure complicated and increasing manufacturing costs. Finally, an unpleasant noise is generated during the braking operation of the brake band.

As described above, the conventional power system of a washing machine is complicated with regard to the arrangement of parts for performing the washing, dehydrating and braking operations, making it difficult to manufacture the same and increasing manufacturing costs. In addition, because of the large number of parts needed for this complicated arrangement, much space is required which, in turn, acts to increase the overall size of the washer.

SUMMARY OF THE INVENTION

Therefore, the present invention is made in an effort to solve the above described problems.

It is an object of the present invention to provide a washing machine having a power system which is simple in its structure, thereby reducing the overall size, especially the height thereof.

To achieve the above objects, the present invention relates to a clothes washing machine comprising a water tub, a spin basket mounted in the water tub for rotation relative thereto about a vertical axis, a motor disposed beneath the water tub, and a drive transmitting mechanism for transmitting rotation between the agitator and spin basket. That mechanism comprises a hollow vertical dehydrating shaft having an upper end connected to the spin basket for rotation therewith, and a laundering shaft extending within the dehydrating shaft. An upper end of the laundering shaft is operably connected to the agitator for rotation therewith. A lower end of the laundering shaft is operably connected to the motor to be driven thereby about the axis. A stationary fixing element is provided and is preferably fixed to the water tub. A coupling gear is operably connected to the motor to be driven thereby, the coupling gear having a first set of teeth. A connecting gear is mounted on the dehydrating shaft for common rotation therewith and for vertical movement relative thereto between upper and lower positions. The connecting gear includes engagement means connectable with the fixing element when the connecting gear is in the upper position, for preventing rotation of the dehydrating shaft and the spin basket. The connecting gear includes a second set of teeth meshable with the first set of teeth when the connecting gear is in the lower position, to interconnect the connecting gear and the coupling gear for rotation and thereby enable the motor to rotate the dehydrating shaft and the laundering shaft together. The coupling gear and connecting gear include a guiding structure for bringing those gears into meshing relationship in response to movement of the connecting gear to the lower position. An elevating mechanism is provided for raising and lowering the connecting gear between the upper and lower positions.

The guiding structure preferably comprises a tooth of extended length on one of the first and second sets of teeth.

The connecting gear also includes a third set of teeth for engaging a fourth set of teeth of the fixing element. One of the teeth of the third and fourth sets is longer than other teeth of that set for guiding the third and fourth sets into meshing relationship.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF A PREFERRED EMBODIMENT OF THE INVENTION

Reference will now be made in detail to the present preferred embodiment of the invention, an example of which is illustrated in the accompanying drawings. Wherever possible, the same reference numbers will be used throughout the drawings to refer to the same or like parts.

Figure 1:
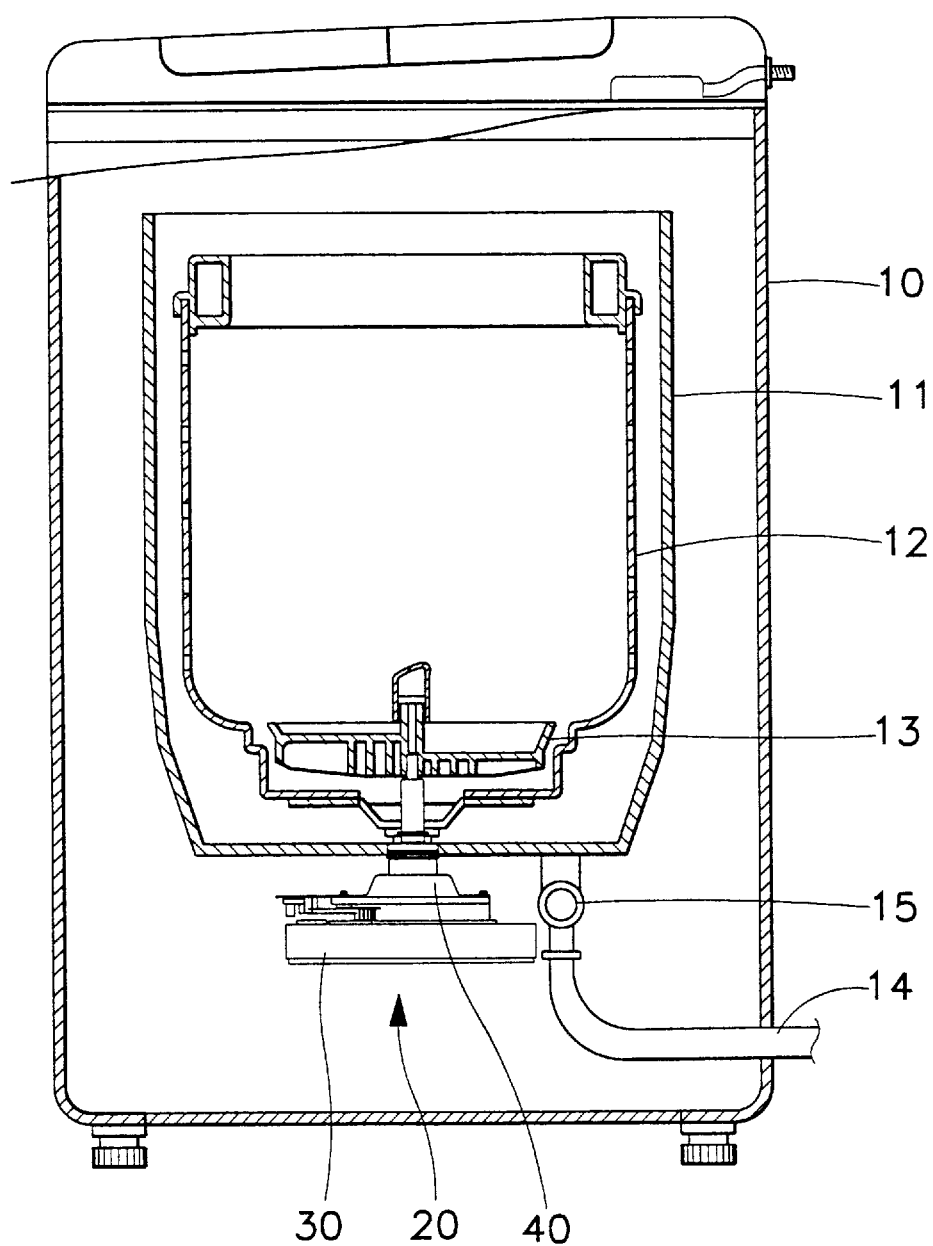
FIG. 1 is a side sectional view illustrating a washing machine where a power system according to the present invention is installed.

Referring first to FIG. 1, the inventive washing machine of the present invention comprises a main body 10 defining an outer configuration thereof and a water reserving drum or water tub 11 installed inside the main body 50 which holds water. A rotating drum or spin basket 12, inside of which laundry is washed, is provided inside the water reserving drum 11. Installed above a bottom surface of the rotating drum 12 is a rotating agitator blade assembly 13 which rotates in forward and reverse directions so as to generate water currents.

A power system 20, for driving the rotating blade assembly 13 and the rotating drum 12, is installed under the water reserving drum 11. The power system 10 comprises a reversible motor 30 and a power transmission system 40, which transmits a rotating force of the reversible motor 30 to the rotating blade assembly 13 or the rotating reservoir 12.

The power transmission system 40 is structured such that a torque of the motor 30 can be transmitted to the rotating blade assembly 13 or, during dehydration (spin drying), to both the rotating blade assembly 13 and the rotating drum 12.

In addition, a drain hose 14 is mounted on the right side (in the drawing) of the water reserving drum 11, the drain hose 14 draining the water from the water reserving drum 11 to the outside of the main body 10. A drain valve 15 for opening/closing the drain hose 14 is mounted on the drain hose 14. A drain motor (not shown), which controls the operation of the drain valve 15 and the power transmission system 40, is mounted between the drain valve 15 and the power transmission system 40.

Figure 2:
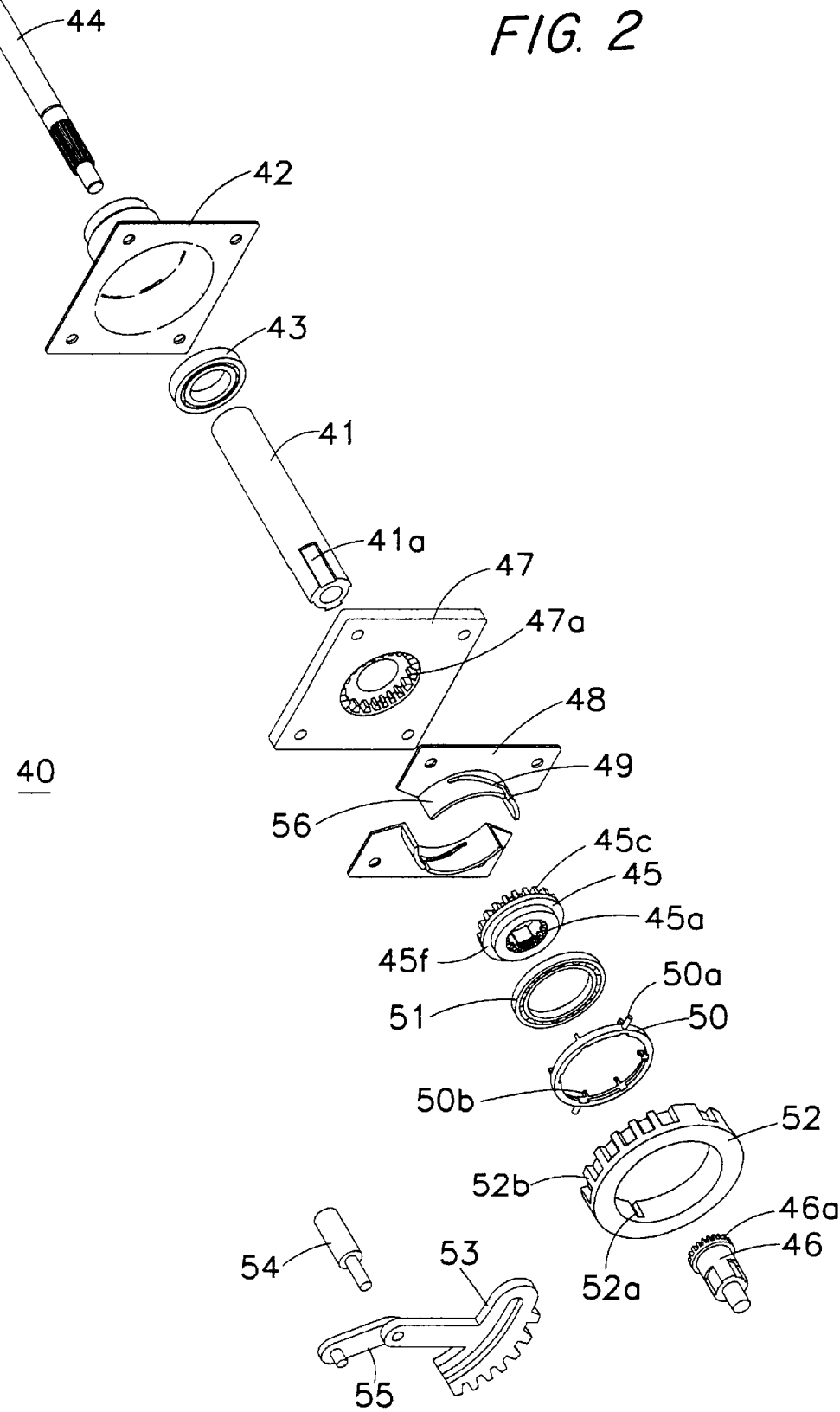
FIG. 2 is an exploded perspective view of a power system according to a preferred embodiment of the present invention.

The power transmission system 40 of the power system 20 will be described hereinafter more in detail with reference to FIGS. 2 and 3.

As shown in the drawings, the power transmission system 40 comprises a hollow dehydrating shaft 41 coupled at its upper portion to the rotating drum 12 and passing through a bottom surface of the water reserving drum 11, and a cylindrical supporting plate 42, mounted on a bottom surface of the drum 11, for supporting the dehydrating shaft 41. A bearing 43 is interposed between the cylindrical supporting plate 42 and the dehydrating shaft 41 so as to provide free-rotation therebetween.

The power transmission system 40 further comprises a laundering shaft 44 inserted into the dehydrating shaft 41, an upper end of which is coupled to the rotating agitator blade assembly 13 and a lower end of which is coupled to a rotor 32 of the reversible motor 30.

A ring-shaped connecting gear 45 is mounted on the dehydrating shaft 41 for vertical movement relative thereto so as to selectively connect the dehydrating shaft 41 to the laundering shaft 42 for common rotation as will be explained. When the connecting gear 45 descends, the dehydrating shaft 41 rotates together with the laundering shaft 44, and when raised, only the laundering shaft 44 is rotated.

A coupling gear 46 which is designed to integrally rotate with the reversible motor 30 is mounted on a lower end of the laundering shaft 44. The coupling gear is engaged with the connecting gear 45 for common rotation when the connecting gear descends.

The power transmission system 40 will be described more in detail in connection with the connecting gear 45.

Figure 4:
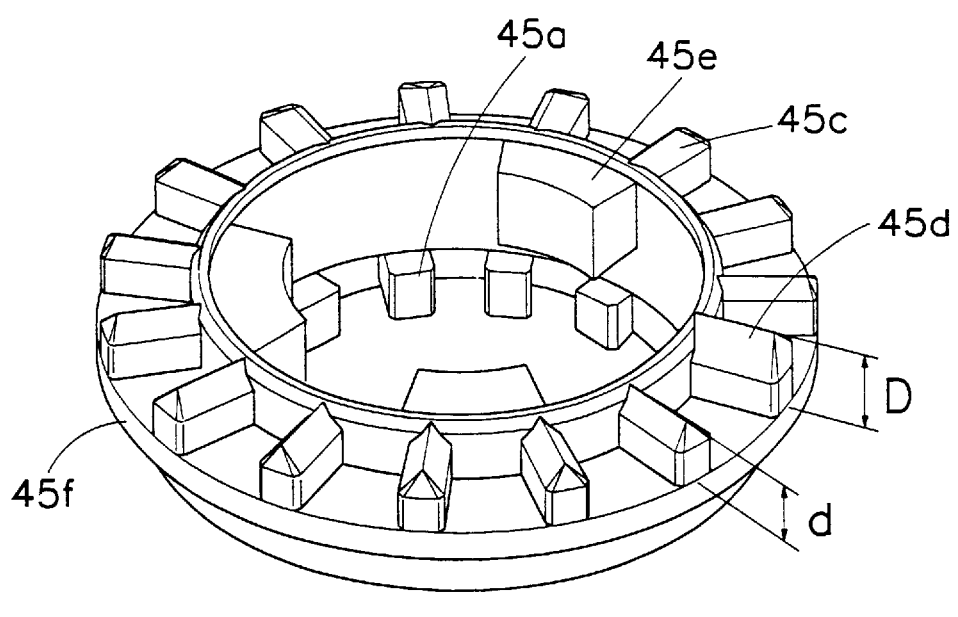
FIG. 4 is a perspective view showing a connecting gear of a power system according to a preferred embodiment of the present invention.

As shown in FIG. 4, the connecting gear 45 is provided with a set of inner teeth 45a formed on a lower portion of an inner circumference thereof and a set of outer teeth 45c formed on an upper portion of an outer circumference thereof. A plurality of projections 45e are formed on upper side of the inner teeth 45a. The shape of the projections 45e corresponds to the shape of a plurality of coupling grooves 41a formed on a lower end of an outer circumference the dehydrating shaft 41, such that the projections 45e of the connecting gear 45 mesh with the coupling grooves 41a of the dehydrating shaft 41 to be rotatable therewith. It is possible for the projections 45e to slide vertically within the coupling grooves 41a.

Each of the inner and outer teeth 45a and 45c has a sharp point so as to ensure the meshing operation. However, to further ensure the meshing operation in the present invention, one of the inner teeth 45a of the connecting gear 45 is formed to be axially longer than the others and thus serves as a guide tooth or gear-alignment tooth 45b.

That is, the guide tooth 45b functions to align the inner teeth of the coupling gear 46 with the spaces between the teeth 46a of the connecting gear 45. Accordingly, if the gears 45, 46 are not perfectly aligned, the guide tooth 45b is first engaged with a corresponding tooth 46a and slides along a side surface of the sharp point of that outer tooth 46a of the coupling gear 46, causing the gear 45 to rotate into alignment with the gear 46.

In addition, coupled on an outer bottom surface of the water reserving drum 11 is a fixing plate 47. The fixing plate 47 is provided with inner teeth 47a meshing with the outer teeth 45c of the connecting gear 45 when the connecting gear 45 is raised, thereby suppressing the rotation of the dehydrating shaft 41. As with the inner teeth 45a of the connecting gear 45, one of the inner teeth 47a of the fixing plate 47 is formed to be longer than the others to serve as a guide tooth or gear-alignment 45d (see FIG. 4 wherein axial length D of the tooth 45d is greater than the length d of the other teeth).

To cause the connecting gear 45 to move vertically along the coupling grooves 41a of the dehydrating shaft 41, there is provided elevating guide means comprising an elevating guide member 48 bolted or screwed to the fixing plate 47. The elevating guide member 48 is composed of two halves. Each of the halves is provided with a semi-cylindrical elevating guide plate 56. The elevating guide plate 56 is provided with an inclined elevating guide slit 49 having an opened lower end. The guide slit is inclined obliquely relative to a horizontal plane.

The elevating guide means further comprises an elevating ring 50 having radially outwardly projecting elevating projections 50a which are formed to correspond to the guide slits 49 so as to be inserted therein. The elevating ring 50 is engaged with a stepped portion 45f of the connecting gear 45, interposing a bearing 51 therebetween. The bearing 51 is fixedly disposed on a plurality of projections 50b formed on an upper end of the elevating ring 50. The bearing 51 prevents rotation of the elevating ring 50 from being transmitted to the connecting gear 45 and vice versa.

Coupled to the elevating projections 50a is an elevating gear 52 which enables the elevating projections 50a of the elevating ring 50 to elevate along the elevating guide slits 49, thereby guiding the elevating operation of the connecting gear 45.

The elevating gear 52 is provided with teeth 52b formed on an outer circumference thereof and a pair of axial grooves 52a corresponding in location to the elevating projections 50a. The projections 50a extend radially through the guide slits 49 and into the grooves 52a. The projections 50a can move vertically relative to the grooves 52a.

A rotating actuator gear 53 for rotating the elevating gear 52 is engaged with the teeth 52b of the elevating gear 52. Connected to the rotating gear 53 by a connecting pin 54 is a connecting bar 55 to which a driving force of the drain motor (not shown) is transmitted.

A coupling relationship between the parts 45, 50, 52 will be described hereinafter. First, the elevating ring 50 is disposed inside the elevating gear 52 with the guide plates 56 disposed radially therebetween, and the connecting gear 45 is disposed inside the elevating ring 50 and is seated thereon. Therefore, when the rotating gear 53 rotates, the elevating ring 50 rises as the projections 50a ride along the elevating guide slits 49 of the elevating guide member 48. Accordingly, the connecting gear 45 rises along with the elevating ring 50.

Figure 3:
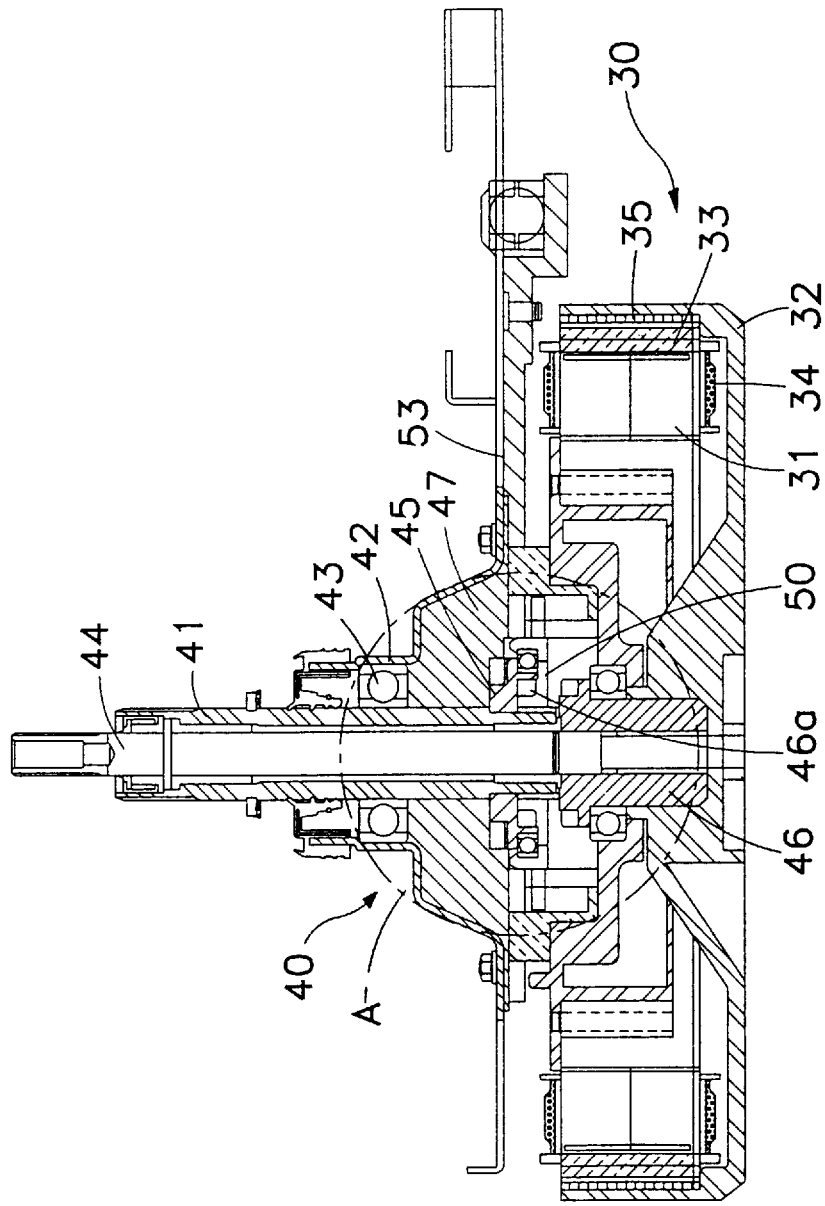
FIG. 3 is a sectional view showing a power system according to a preferred embodiment of the present invention.

As shown in FIG. 3, the driving motor 30 of the power system 20 is a brushless DC motor comprised of a rotor 32 and a stator 31 disposed inside the rotor 32. The coupling gear 46 engaged with the laundering shaft 44 of the power transmission system 40 is coupled on a central portion of the rotor 32. Magnets 35 are mounted along an inner circumference of the rotor 32. The stator 31 is comprised of a core 33 facing the magnet 35 and a coil 34 wound around the core 33 so that the rotor 32 drives by electromagnetic force generated between the core 33 of the stator 31 and the magnets 35 of the rotor 32 by electric current in the coil 34.

The operation of the above described power system 20 of the washing machine according to the present invention will be described hereinafter.

Figure 5A:
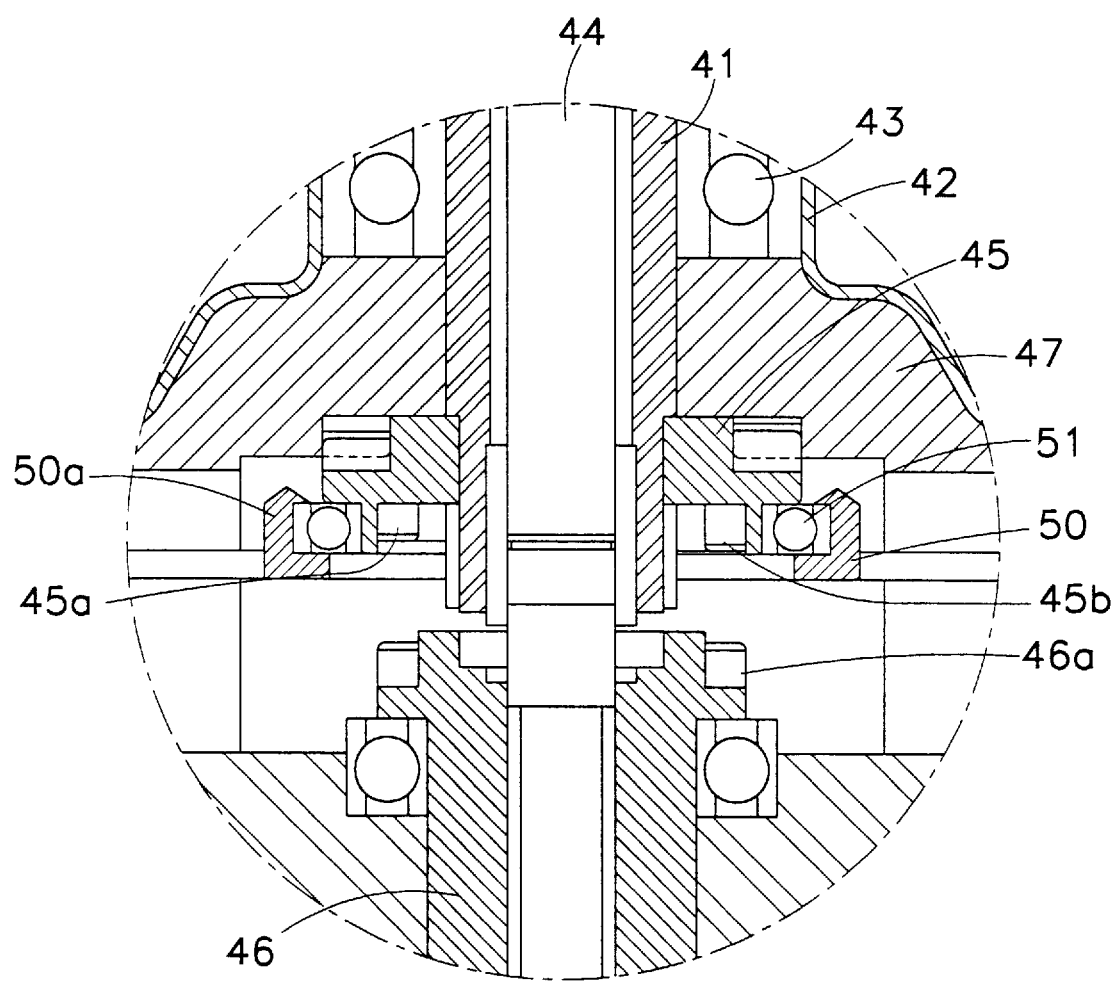
FIG. 5A is an enlarged view of a circled portion in FIG. 3 illustrating an operating state of a connecting gear during a laundering operation.

A washing operation (as opposed to a spin drying operation) will be first described with reference to FIGS. 2, 3 and 5A. The rotating gear 53 is rotated in a first direction by the drain motor (not shown) which causes the elevating gear 52 to rotate, along with the elevating ring 50. Accordingly, the elevating projections 50a ascend along the elevating guide slits 49 of the elevating guide member 48 such that the elevating ring 50 ascends. As a result, the connecting gear 45 ascends along the coupling grooves 41a of the dehydrating shaft 72 so that the outer teeth 45c of the connecting gear 45 become fixed against rotation by meshing with the inner teeth 47a of the fixing plate 47. If the teeth of the gear 45 are not perfectly aligned with the spaces between the teeth 47a, then the guide tooth 45d will engage a tooth 47a and rotate the gear 45 into such alignment.

In the above state, after the laundry is placed in the rotating drum 12 and water is fed to the water reserving drum 11, when the electric current is applied to the motor 30, the rotor 32 of the motor 30 oscillates in the forward and reverse directions. Here, the laundering shaft 44 and the coupling gear 46 rotate together with the motor 90, thereby oscillating the agitator blade assembly 13 for performing the washing/rinsing operation.

When the washing/rinsing operation is finished, the water reserved within the water reserving drum 11 is drained by the opening of the drain valve 15 according to the operation of the drain motor (not shown).

Figure 5B:
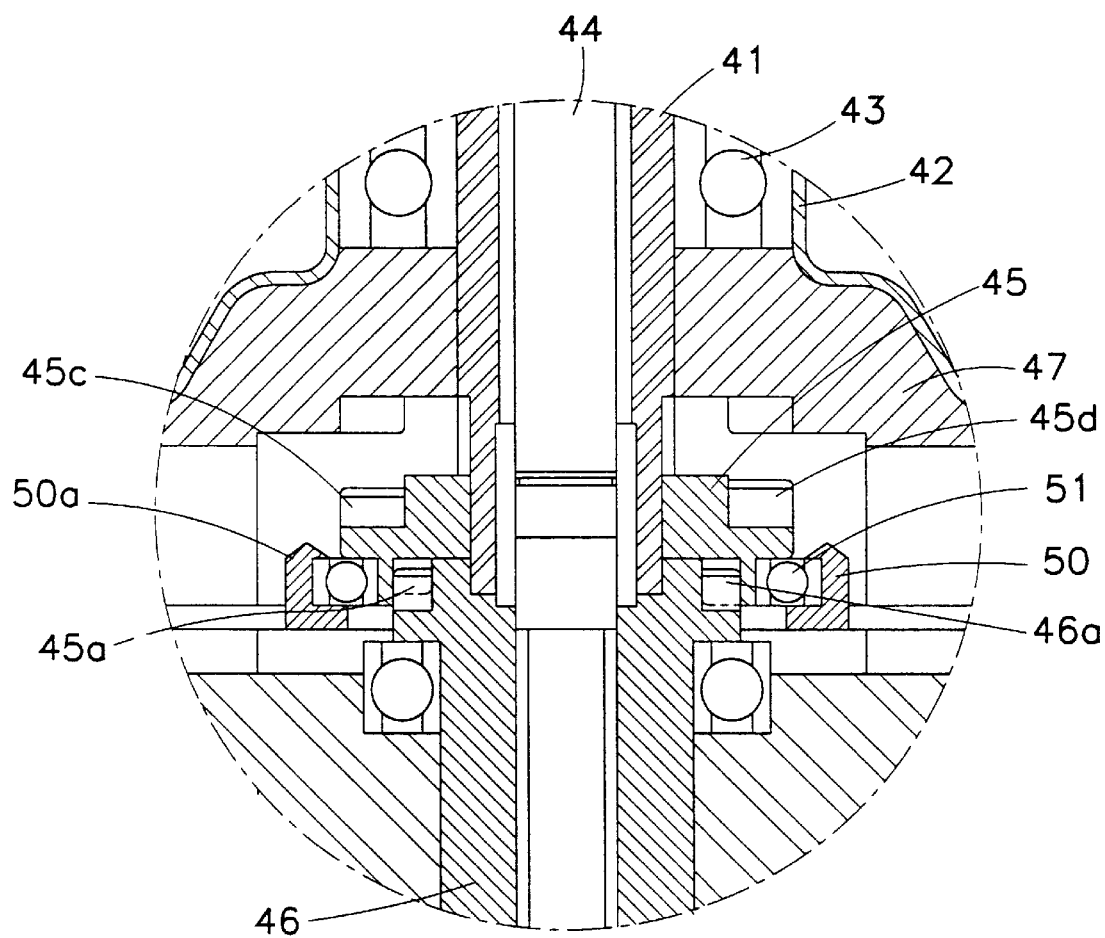
FIG. 5B is an enlarged view of a circled portion in FIG. 3 illustrating an operating state of a connecting gear during a dehydrating operation.
Figure 6:
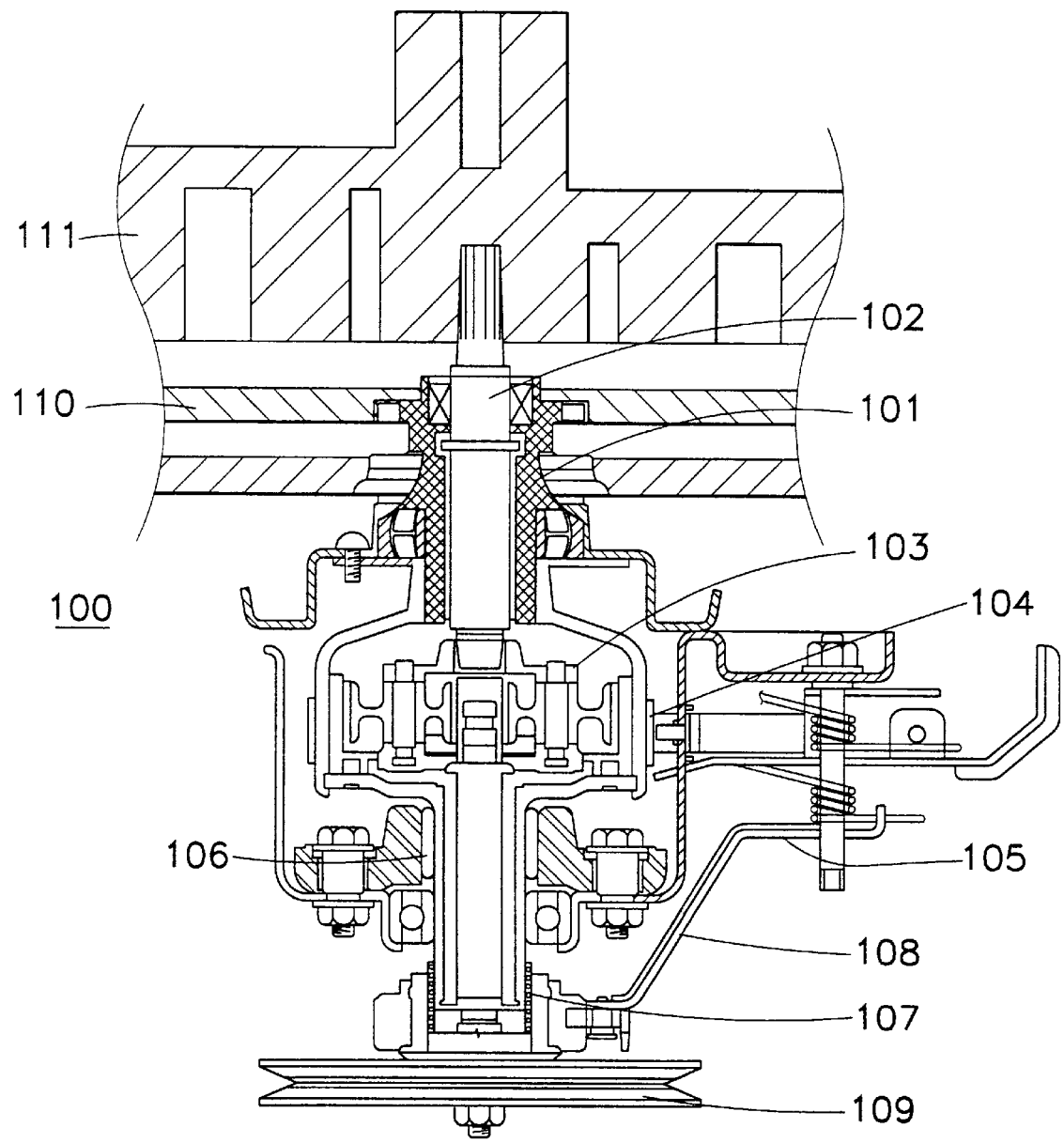
FIG. 6 is a sectional view showing a conventional power system.

After the water is completely drained, the dehydrating (spin drying) operation is performed while the drain valve 15 remains opened. The operation of the power system 20 during the dehydrating stroke will be described hereinafter with reference to FIGS. 2, 3 and 5b.

When the drain valve 15 is being opened by the drain motor (not shown), the power transmission system 40 changes to a dehydrating driving state. That is, when the drain motor is operated, the drain valve 15 is opened, and at the same time, the rotating gear 53 rotates the elevating gear 52 in a second direction, causing the elevating projections 50a to descend along the elevating guide slits 49 of the elevating guide member 48, thereby lowering the elevating ring 50.

As a result, the connecting gear 45 descends along the coupling grooves 41a of the dehydrating shaft 41, and the inner teeth 45a of the descended connecting gear 45 mesh with the outer teeth 46a of the coupling gear 46. That is, the guide tooth 45b of the connecting gear 45 is first engaged with one of the outer teeth 46a of the coupling gear 46 to bring the gears 45, 46 into alignment for meshing of the teeth. In this state, when power is applied to the driving motor 30 so as to rotate the rotor 32 at a high speed, the laundering shaft 44 and the connecting gear 45 engaged with the coupling gear 46 also rotate together at a high speed, thereby rotating the dehydrating shaft 41 at a high speed.

By this operation, the rotating blade assembly 13 and the rotating drum 12 rotate at a high speed such that the water retained in the laundry is forced out by the centrifugal force and drained through the drain hose 14.

When the motor 30 stops, electrical power is applied to the motor such that a reversed magnetic flux can be generated in the coil 34 and, thus, reversed electromagnetic force can be generated in the rotor 32. Therefore, the motor generates reverse rotational force such that the rotating speed of the rotor 32 is rapidly reduced and consequently stopped. The operation is controlled by a control portion of the washing machine.

As described above, in the power system 20 of the present invention, since the power control of the laundering and dehydrating shafts 44 and 41 are realized by meshed gears, and the braking force and power transmission are controlled by a brushless motor 30, driving control by physical frictional force (e.g., a brake band) is not required, thereby reducing the amount of noise.

In addition, since the power transmission system 40 is directly connected to the drive motor 30, an additional connecting member is not required, reducing the manufacturing costs.

Furthermore, the guide teeth 45b, 45d make it possible for the meshing of gear 45 to be smoothly realized.

Although the long guide teeth 45b and 45d are disposed on the connecting gear 45 in the disclosed embodiment, they could instead be formed on the coupling gear 46 or the fixing plate 47.

While the invention has been described in connection with what is presently considered to be the most practical and preferred embodiment, it is to be understood that the invention is not limited to the disclosed embodiment, but, on the contrary, it is intended to cover various modifications and equivalent arrangements included within the spirit and scope of the appended claims.

What is claimed is:

1. A clothes washing machine comprising:

a water tub;

a spin basket mounted in the water tub for rotation relative thereto about a vertical axis;

an agitator mounted in the spin basket for rotation about the axis;

a motor disposed beneath the water tub; and a drive transmitting mechanism for transmitting rotation between the agitator and spin basket comprising:

a hollow vertical dehydrating shaft having an upper end connected to the spin basket for rotation therewith;

a laundering shaft extending within the dehydrating shaft, an upper end of the laundering shaft operably connected to the agitator for rotation therewith, a lower end of the laundering shaft operably connected to the motor to be driven thereby about the axis;

a stationary fixing element;

a coupling gear operably connected to the motor to be driven thereby, the coupling gear including a first set of teeth; and a connecting gear mounted on the dehydrating shaft for common rotation therewith and for vertical movement relative thereto between upper and lower positions, the connecting gear including engagement means connectable with the fixing element when the connecting gear is in the upper position, for preventing rotation of the dehydrating shaft and the spin basket, the connecting gear including a second set of teeth meshable with the first set of teeth of the coupling gear when the connecting gear is in the lower position to interconnect the connecting gear and the coupling gear for rotation and thereby enable the motor to rotate the dehydrating shaft and the laundering shaft together;

the coupling gear and connecting gear including guiding structure for bringing the first and second sets of teeth into meshing relationship in response to movement of the connecting gear to the lower position;

an elevating mechanism for raising and lowering the connecting gear between the upper and lower positions.

2. The washing machine according to claim 1 wherein the first set of teeth project upwardly and the second set of teeth project downwardly, a tooth of one of the first and second sets of teeth being longer than other teeth of said one set and defines said guiding structure.

3. The washing machine according to claim 2 wherein said longer tooth is sharply pointed.

4. The washing machine according to claim 3 wherein all of the teeth of the first and second sets are sharply pointed.

5. The washing machine according to claim 3 wherein said longer tooth is disposed on said connecting gear.

6. The washing machine according to claim 1 wherein the engagement means comprises a third set of teeth, the fixing element comprising a fixing plate fixed to the water tub and having a fourth set of teeth meshable with the third set of teeth when the connecting gear is in the upper position.

7. The washing machine according to claim 6 wherein the third set of teeth project upwardly, and the fourth set of teeth project downwardly, one of the teeth of the third and fourth sets being longer than other teeth of such set for defining a guiding structure guiding the third and fourth sets of teeth into meshing relationship in response to the connecting gear being moved to the upper position.

* * * * *